Sept. 20, 1971  HIDEO TAKAMIZAWA  3,606,595
ELECTROMAGNETIC PUMP UTILIZING A PERMANENT MAGNET
Filed Jan. 20, 1970

INVENTOR.
HIDEO TAKAMIZAWA
ATTORNEY

United States Patent Office 3,606,595
Patented Sept. 20, 1971

3,606,595
ELECTROMAGNETIC PUMP UTILIZING A PERMANENT MAGNET
Hideo Takamizawa, Higashi-Matsuyama-shi, Japan, assignor to Jidosha Kiki Kabushiki Kaisha, Tokyo, Japan
Filed Jan. 20, 1970, Ser. No. 4,286
Claims priority, application Japan, Feb. 3, 1969, 44/7,346
Int. Cl. F04b 35/04
U.S. Cl. 417—417
1 Claim

ABSTRACT OF THE DISCLOSURE

An electromagnetic pump in which a fluid can be pumped up by means of a reciprocating motion of a magnetic armature moved by attractive and repulsive forces which act alternately between two permanent magnets inserted in a resin molded pump body and the movable magnetic armature magnetized by an alternating current.

---

The present invention relates to an electromagnetic pump utilizing two permanent magnets.

Heretofore, an electromagnetic pump utilizing an alternating current is of a system intended to drive a plunger or to attract a movable iron piece by an interrupting current induced from the alternating current by means of one or more rectifying elements. In this case, it is necessary to provide a magnetic circuit appropriate to obtain a strong magnetic force, and in the magnetic circuit a metal through which a magnetic flux may be easily passed is used. In this type of construction, moreover, a pump body must be made of a large number of members, and consequently said pump has a large number of the components and of heavy weight. Therefore, in said conventional electromagnetic pump, there are inherent disadvantages that the cost is high especially in case of an electromagnetic pump with a low discharge capacity and a low discharge pressure, and it is difficult to obtain a required performance due to a disadvantage of the large size of the constructing of the pump and consisting of a large number of pieces.

The purpose of this invention is, therefore, to eliminate the drawbacks mentioned and to provide a simple and light weight electromagnetic pump in which a fluid can be pumped up by means of a reciprocating motion of a magnetic armature moved by attractive and repulsive forces which act alternately between two permanent magnets inserted in a resin molded pump body and the movable magnetic armature magnetized by an alternating current.

In order that the present invention may be more readily understood, reference will now be made, by way of example, to the accompanying drawings in which.

Figure 1:
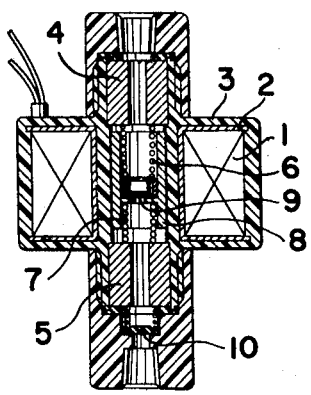
FIG. 1 is a cross section of the electromagnetic pump.

This invention will now be described with reference to the embodiment shown in the drawings.

In the FIG. 1, numeral 1 denotes an exciting winding on a bobbin 2 of a coil, and numeral 3 denotes a pump body which is resin molded into a hollow cylinder so as to be able to enclose said exciting winding 1 and to pass smoothly a movable magnetic pole 8 therethrough. The permanent magnets 4 and 5 are fixed in the pump body 3 facing the same pole to each other. Between said two permanent magnets 4 and 5 through two springs 6 and 7 is inserted a movable magnetic armature 8. Numerals 9 and 10 denote valves for providing a pumping action by the reciprocating motion of the movable magnetic pole 8.

Figures 2A, 2B:
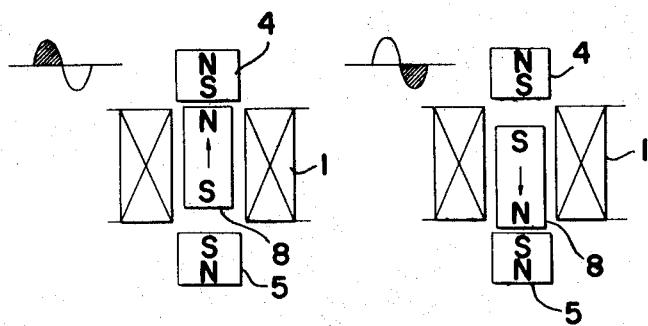
FIGS. 2a and 2b are explanatory views of the operation by the magnet relation between two permanent magnets and an electro-magnetic armature.

The operation of the device according to this invention is as follows:

Now, on the condition shown in FIG. 2a, that is to say, when a positive half-wave of an alternating current passes through the exciting winding 1, the movable magnetic armature 8 is magnetized by this current, so that the N-pole is produced at the upper portion of the magnetic pole 8 and S-pole is produced at its lower portion. In this case, since the permanent magnets 4 and 5 are positioned facing the same pole to each other on the both sides of the movable magnetic pole 8, the N-pole of the movable magnetic pole 8 and the S-pole of the permanent magnet 4 are attracted to each other while the S-pole of the movable magnetic pole 8 and the S-pole of the permanent magnet 5 ae repelled to each other, whereby the movable magnetic armature 8 moves upwardly. Now, when a negative half-wave of the alternating current flow through the exciting winding 1, as shown in the FIG. 2b then the polarity of the movable magnetic armature 8 is reversed, so that the upper portion of the movable magnetic pole 8 becomes S-pole and its lower portion N-pole. Thus, the permanent magnet 4 attracts against the upper pole and permanent magnet 5 repels to the lower pole, thereby the movable magnetic armature 8 may be downwardly moved. In this way, the movable magnetic armature 8 is reciprocated upwards and downwards by action of the alternating current, and by means of the movable magnetic armature 8 and said two valves 9 and 10, a pumping action is provided.

Therefore, the electromagnetic pump according to this invention constructed as stated above has features and effects as following:

(1) Since is is unnecessary to provide a half-wave rectification of an alternating current, a rectifying element may be eliminated.

(2) Since there are not provided with a core and yoke etc. for a magnetic circuit, it may be easy to resin mold a pump body, and consequently the construction of the device becomes simple and it may be possible to minimize the cost of the device and to reduce the weight of it.

(3) Since a close accuracy of the size may be obtained by the resin molding, it is possible to minimize a loss in the performance.

(4) There is little effect of voltage fluctuation on the performance of pump.

(5) Since the pump body may be resin molded, this pump is capable to work safely, namely, there is small eddy-current loss, no fear of a corrosion, short-circuit and disconnection of coil and an electric leakage.

Many variations may be effected without departing from the spirit of the present invention. It is to be understood that these, together with other variations in details, are anticipated by the appended claim.

What I claim is:

1. An electromagnetic pump comprising a resin-molded pump body having a stepped hole at the central portion thereof and resin-molded integrally a coil, a pair of permanent magnets fixed within the hole of the pump body and arranged so that their polarities are symmetrical to each other, each of said permanent magnets being axially magnetized and having a centrally axially arranged fluid channel, a movable magnetic armature coaxially arranged between the permanent magnets to be able to perform the reciprocating motion within the hole of the pump body, said movable magnetic pole being magnetized by alternating current and having a centrally axial fluid channel, a first spring having one end portion pressed against one of the permanent magnets and the other end portion against the exhaust side of the movable magnetic armature, a second spring having one end portion pressed against the other permanent magnet and the other end portion against the suction side of the movable magnetic armature, a check valve fixed inside the movable magnetic pole by the first spring to perform opening and closing operations by means of the reciprocating motion of the movable magnetic armature, and a further check valve fixed outside either one or the other of the permanent magnets to perform opening and closing operations by means of the reciprocating motion of the movable magnetic armature.

References Cited

UNITED STATES PATENTS

| | | | |
|---|---|---|---|
| 2,686,280 | 8/1954 | Strong et al. | 318—125 |
| 3,103,603 | 9/1963 | Reutter | 310—30 |

DONOVAN F. DUGGAN, Primary Examiner

U.S. Cl. X.R.

310—30